(12) United States Patent
Ballata et al.

(10) Patent No.: US 6,408,915 B1
(45) Date of Patent: Jun. 25, 2002

(54) APPARATUS FOR MONITORING THE CURE PROFILE ALONG A PULTRUSION DIE

(75) Inventors: William O. Ballata, Hayside, KS (US); David Spagnuolo, Newark, DE (US); J. Robert Klinger, Easthampton, MA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/506,933

(22) Filed: Feb. 18, 2000

(51) Int. Cl.⁷ .............................................. B29C 70/52
(52) U.S. Cl. ....................... 156/351; 156/441; 156/180; 264/137; 425/110
(58) Field of Search ................................. 156/180, 433, 156/441, 351; 264/137; 425/110

(56) References Cited

U.S. PATENT DOCUMENTS 5,635,845 A * 6/1997 Strong et al. ............... 324/693
6,061,902 A * 5/2000 Kalamkarov et al. ......... 29/825

OTHER PUBLICATIONS

Shanku et al, "Dielectric and Thermal cure Characterization of resin Used in Pultrusion", 42$^{nd}$ International SamPE Symposium, 42, May 4–8, 1400–1413, 1997 (abstract).*

* cited by examiner

Primary Examiner—Sam Chuan Yao
(74) Attorney, Agent, or Firm—Paul S. Clohan, Jr.; U. John Biffoni; William Randolph

(57) ABSTRACT

An apparatus for monitoring the cure of a resin-impregnated material includes a pultrusion die; a plurality of first electrodes mounted in the pultrusion die; a plurality of insulators surrounding the plurality of first electrodes, respectively, in the pultrusion die; a resin-impregnated preform that includes a second electrode therein, the resin-impregnated preform being inserted into the pultrusion die; a constant contact electrode that contacts the second electrode; and a power supply connected to the constant contact electrode wherein electric current flows from the power supply to the constant contact electrode then to the second electrode then through the resin-impregnated preform to the plurality of first electrodes.

28 Claims, 4 Drawing Sheets

APPARATUS FOR MONITORING THE CURE PROFILE ALONG A PULTRUSION DIE

GOVERNMENT INTEREST

The invention described herein may be manufactured, used and/or licensed by or for the United States Government.

BACKGROUND OF THE INVENTION

The invention relates to a method and apparatus for profiling the cure within a pultrusion tool. Monitoring the profile of the degree of cure along the length of a pultrusion tool (die) allows understanding of the cure profile's response to different processing parameters. Once this understanding is complete and simulations are developed to model the cure profile's performance, the profile can be used as a process control input. Then the process can be fully automated to insure optimal processing and quality.

Composite materials can be manufactured in many ways, the most economical of which is pultrusion. Pultrusion is used to manufacture constant cross-section material in a continuous process. It is desired to optimize processing to maintain quality and increase line speed to its maximum. Current state of the art includes extensive heat transfer and resin kinetic modeling (see Sumerak, Joseph E., "Pultrusion Die Design Optimization Opportunities Using Thermal Finite Element Analysis," The Society of the Plastics Industry, Inc. Feb. 7–9, 1994, session 9-C pp. 1–7). These models are then coupled to process sensors to allow for process control. As Dr. Joseph Sumerak on pultrusion process control has stated: "The most critical controls are found in the control of line speed and die temperatures, both of which have primary impact on the state of cure of the composite pultrusion. Sophisticated control scenarios for closed-loop line speed control and PID temperature control provide precision in response to operator setpoints. Unfortunately, however, the ability to continuously detect the degree of cure of the composite for use as a process control parameter does not yet exist. " Sumerak, Joseph E., "The Pultrusion Process for Continuous Automated Manufacture of Engineered Composite Profiles," Composites Engineering Handbook, Edited by P. K. Mallick, 1997, Chapter 11, pp. 549–577.

Several attempts at placing pressure, temperature, and dielectric sensors into the die have been made (see Nolet, S. C., "Development of a Sensor for Continuously Monitoring the Degree of Cure of Composite Materials during Pultrusion," Report No.: NSF/ISI-89022. Cable, D., "Embedded fiber optic pressure and temperature sensors enable cure monitoring of pultruded composite materials," Society of Manufacturing Engineers, Conference on Effective Manufacturing Methods of Pultrusion, Manhattan Beach, Calif., May 9–10, 1990, pp. 6. Fanucci, J. P.; Nolet, S. C.; Koppernaes, C.; Chou, Hsin-Nan, "Thin disposable pressure sensors for composite material process monitoring," Society for the Advancement of Material and Process Engineering, 1990, pp. 1205–1219. Methven, J. M.; Katramados, Y., "In-line quality monitoring of pultruded profiles using dielectric Measurements," Polymers and Polymer Composites, 5, (1), pp. 15–20). The present invention inexpensively, continuously, and easily profiles the degree of cure in the pultrusion die.

SUMMARY OF THE INVENTION

An important object of the invention is to provide an improved method and apparatus to determine the degree of cure along the length of a pultrusion die. Advantages of the invention include increased accuracy, increased applicability, and reduced costs.

First, the invention offers considerable increases in accuracy by (1) using a sensor methodology that is not as subject to degradation as dielectric sensors; (2) using an electrical circuit configuration that allows direct measurement across the resin material; and (3) using a series of sensors across cross-sections of a die to monitor the cure profile along the length of the die in different thickness regions; and (4) using a series of sensors that allow the cure profile along the length of the pultrusion tool to be monitored.

Second, the invention offers considerably increased applicability by (1) using a sensor configuration that is easily integrated into the tool; (2) monitoring the degree of cure along the length of the tool; (3) using a sensor material that is easy to integrate into the preform; (4) using a sensor material that is common to composite material construction to therefore prevent any degradation of the properties of the composite material; and (5) using either Alternating Current (AC) or Direct Current (DC).

Finally, the invention offers a considerable cost savings advantage by (1) eliminating expensive sensors; (2) eliminating the need for specialized coating of sensors to extend life; and (3) allowing the process to be optimized and then fully automated.

DETAILED DESCRIPTION OF THE PREFERRED EMBODIMENTS

The present invention allows continuous monitoring of the degree of cure using robust sensors located along the length of a pultrusion die. Accurately monitoring the degree of cure is vital to process control in pultrusion. The sensors provide degree of cure information through the measuring of the dielectric properties of the resin as it cures (see Mijovic, J.; Kenny, J. M.; Maffezzoli, A.; Trivisano, A.; Bellucci, F.; and Nicolais, L., "The Principles of Dielectric Measurements for In-Situ Monitoring of Composite Processing," Composites Science and Technology, v. 49, 1993, pages 277–290).

The existence of multiple degree of cure data points along the length of the die allows for a continuous curve to be formed. The shape of that degree of cure profile has significant effects on the quality and speed at which the process can be run. Extensive kinetic modeling of the pultrusion process has been done. The problem is that no corresponding process data can be used for control purposes. The kinetic models yield an optimal process for a given geometry and material configuration, and when integrated with the data from this invention, will allow for automated expert system process control. The control system insures optimal processing even if changes occur in the process environment, as displayed by changes in the sensor inputs of the present invention.

Figure 1:
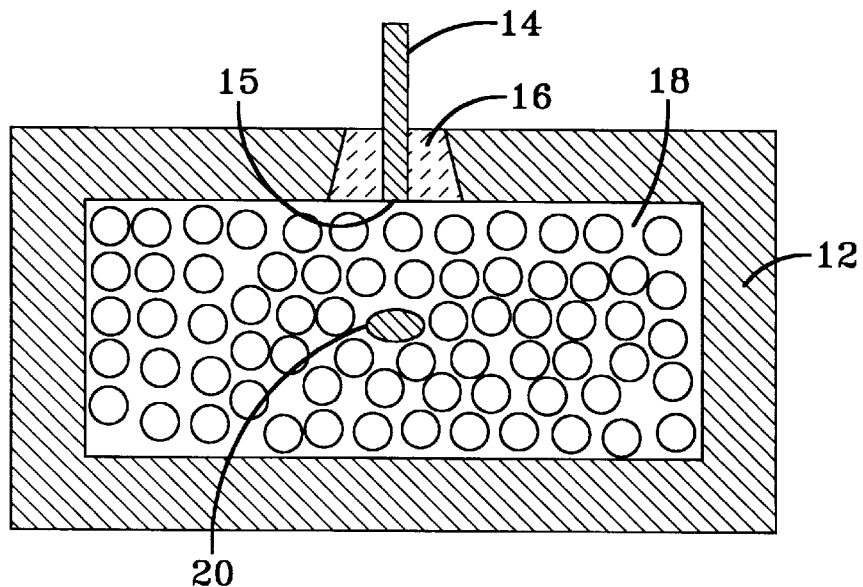
FIG. 1 is a schematic cross-sectional end view of an embodiment of the invention.

FIG. 1 is a schematic cross-sectional end view of an embodiment of the invention. An electrode 14 is mounted in a pultrusion die 12. The electrode 14 is electrically isolated from the pultrusion die 12 by an insulator 16. Isolation of the electrode 14 is necessary to maintain the integrity of the signal from the electrode 14.

The pultrusion die 12 is made of, for example, hardened steel. The insulator 16 is preferably made of a material at least as hard as the die 12, for example, a ceramic material. The electrode 14 may be made of any conductive material. However, to minimize the effects of wear, the electrode 14 is preferably made of a material at least as hard as the die 12, for example, hardened steel. It is advantageous to make the electrode 14 from the same material as the die 12 to minimize any differences in wear. The die 12 is machined to provide a space for the insulator 16 and electrode 14. The end 15 of the electrode 14 is preferably mounted substantially flush with the internal surface of the die 12. Protection of the electrode 14 from wear, if necessary, may be similar to that used by Nolet, referenced above.

The die mounted electrode 14 is the voltage signal receiver or "sense lead." A second electrode 20 is included in a resin-impregnated preform 18. The preform itself, without the resin, is preferably nonconductive. The second electrode 20 is a conductive filament integrated into the preform 18. Preferably, the second electrode 20 is a carbon tow. Carbon tows are advantageous because they are base materials for some polymer composites and will not negatively affect the mechanical properties of the finished material. The preform 18 is made of, for example, fiberglass tows.

Figure 2:
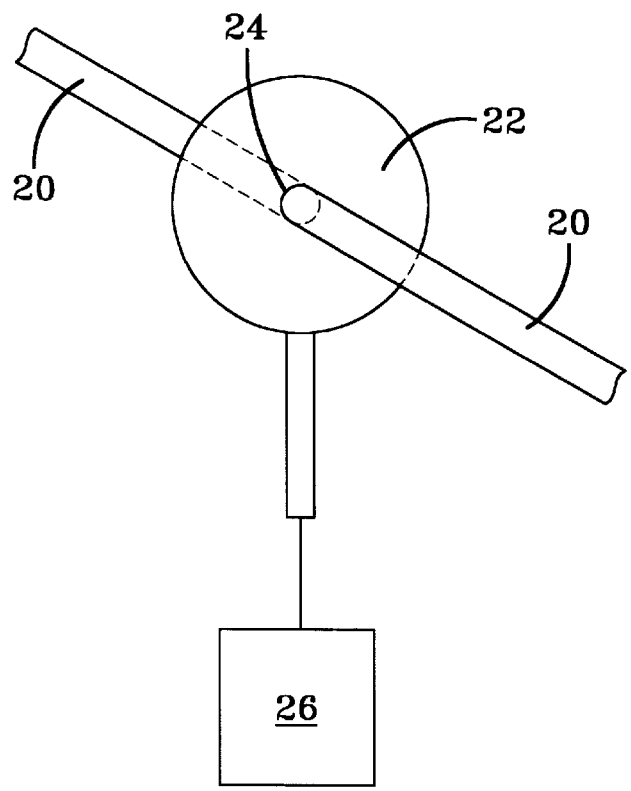
FIG. 2 is a schematic view of the constant contact electrode.

FIG. 2 is a schematic view of the constant contact electrode 22. The second electrode 20 is in constant contact with the constant contact electrode 22 prior to entering the die 12. The constant contact electrode 22 is connected to a power supply 26. The power supply may be either direct current (DC) or alternating current (AC). The constant contact electrode 22 provides a voltage signal to the second electrode 20.

The second electrode 20 acts as the signal carrier or "excitation lead." The type of current passed can be either direct current or alternating current. Direct current measures purely ionic mobility, which is better for examining gelation. Alternating current measures the dielectric properties. The polarities of the electrodes 14, 20 can be reversed if desired.

An advantage of the invention is that it directly measures the properties of the resin between the second electrode 20 and the electrode 14 mounted in the die surface. Therefore, the sensed material is a volume rather than a surface area as in standard dielectric devices. The thermoset or thermoplastic resin in fluid form acts as a variable resistor and capacitor combination, similar to RTM process sensors. See, for example, U.S. Pat. No. 5,210,499 issued on May 11, 1993 to S. M. Walsh and entitled "In-situ Sensor Method and Device," which patent is hereby expressly incorporated by reference.

Figure 3:
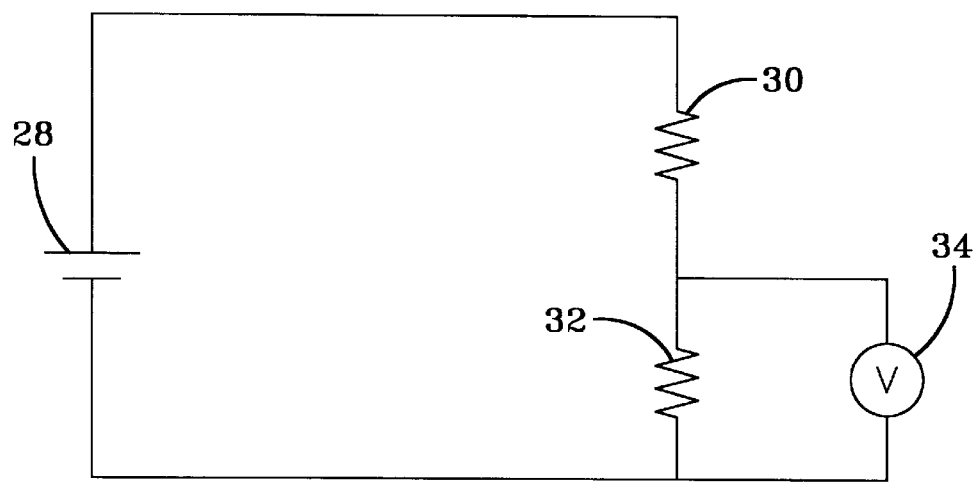
FIG. 3 is a simplified circuit diagram of an embodiment of the invention with a DC power supply.

An exemplary circuit analysis for a DC power supply is shown in FIG. 3. The DC circuit does not include capacitive effects because there are no frequency changes. The AC circuit (not shown) includes both resistance and capacitance. Therefore, AC is better for detailed sensing all the way to the vitrification point.

The resistance 30 in the circuit of FIG. 3 is the resin resistance across a distance from the second electrode 20 to the die mounted electrode 14. The voltmeter 34 recognizes the resin resistance 30 by measuring the voltage that can pass across the resin over a known resistor 32. That voltage is compared to the initial signal voltage, and the result is the resistance 30. The resistance 30 can be correlated to the degree of cure through known electro-kinetic models.

Figure 4:
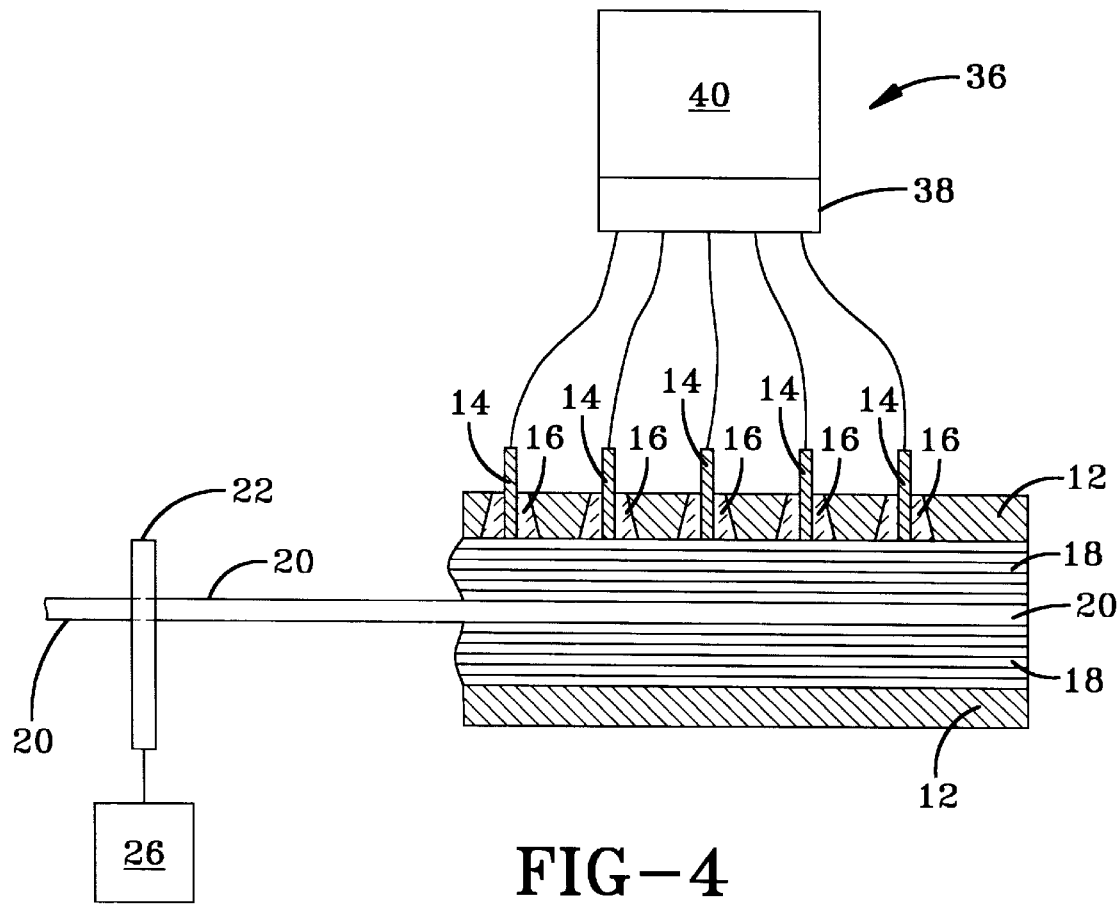
FIG. 4 is a schematic partial cross-sectional side view of an embodiment of the invention.

FIG. 4 is a schematic partial cross-sectional side view of an embodiment of the invention having a plurality of electrodes 14. Each electrode 14 is surrounded by an insulator 16 as described with respect to FIG. 1. The power supply 26 is connected to the constant contact electrode 22. The constant contact electrode 22 contacts the second electrode 20 before it is integrated into the preform and enters the die 12. It should be evident to one of skill in the art of pultrusion that the bundles of fibers that eventually become the preform and the addition of the resin to the preform are not shown in FIG. 4, for clarity.

Each electrode 14 is connected to a voltmeter 38, which is part of a known data acquisition system 36. The data acquisition system 36 includes a computer 40. The number of die inserted electrodes 14 can be extrapolated to attain a continuous curve of the degree of cure along the length of the pultrusion die 12.

Electrodes 14 may be added to the die 12 to measure the different zones of the die. The entrance region may be of particular interest to ensure proper wetout of the tows, accomplished through observation of the magnitude of the signal. The central heating zones need to be monitored so that the reaction does not auto-accelerate out of control. The exit region needs to have a fully cured part unless post curing is desired, then the insurance of geometric stability can be monitored. All of these regions and effects can be monitored by examining the degree of cure. This is where extensive kinetic and thermal finite element analysis can be done to optimize the die configuration. The electrodes 14 can be used to validate model results or give a proper baseline from which to adjust.

Figure 5:
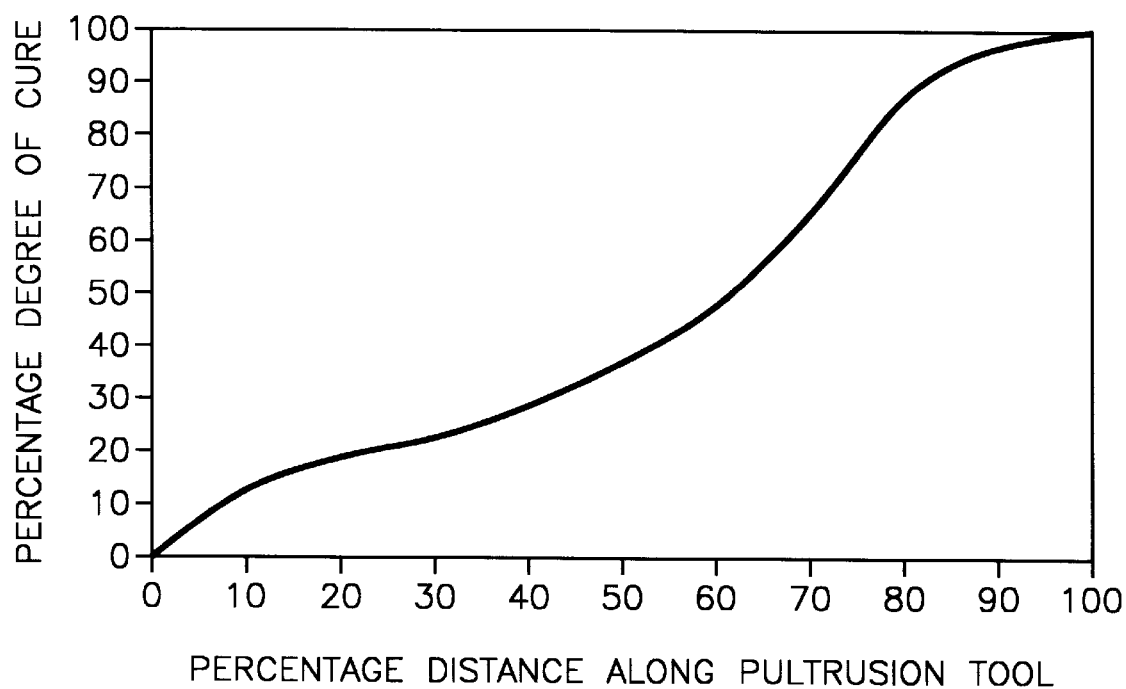
FIG. 5 is an example of a cure profile.

The data output from each of the electrodes 14 may be plotted against their respective position along the length of the die 12 yielding a continuous degree of cure curve. FIG. 5 shows an exemplary predicted cure profile. The curve's shape may be adjusted by changing any of the process variables. The experimental data can be compared to the pultrusion kinetic modeling; hence, kinetic models can be validated and optimized. An expert system or neural network type of control system integrated with kinetic and thermal models, that will take into account the changing boundary conditions, could control the process. Finally, the cure profile will reflect any changes in the manufacturing environment and will allow the automated control system to make decisions on-line to maintain continual optimal processing.

Figure 6:
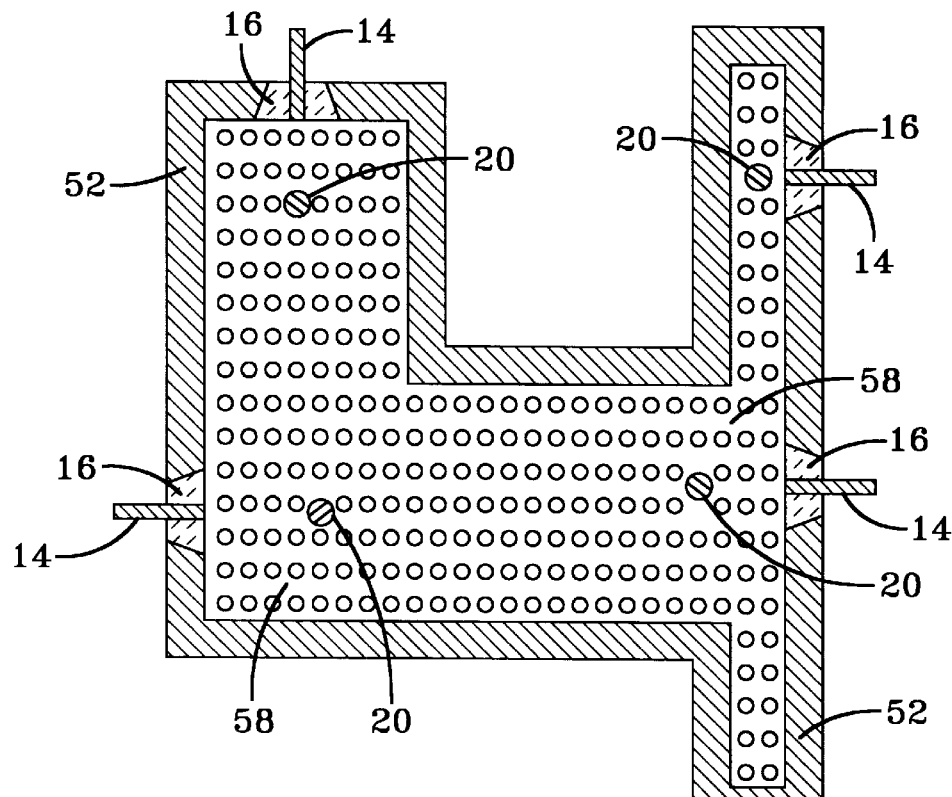
FIG. 6 is a schematic cross-sectional end view of another embodiment of the invention.
Figure 7:
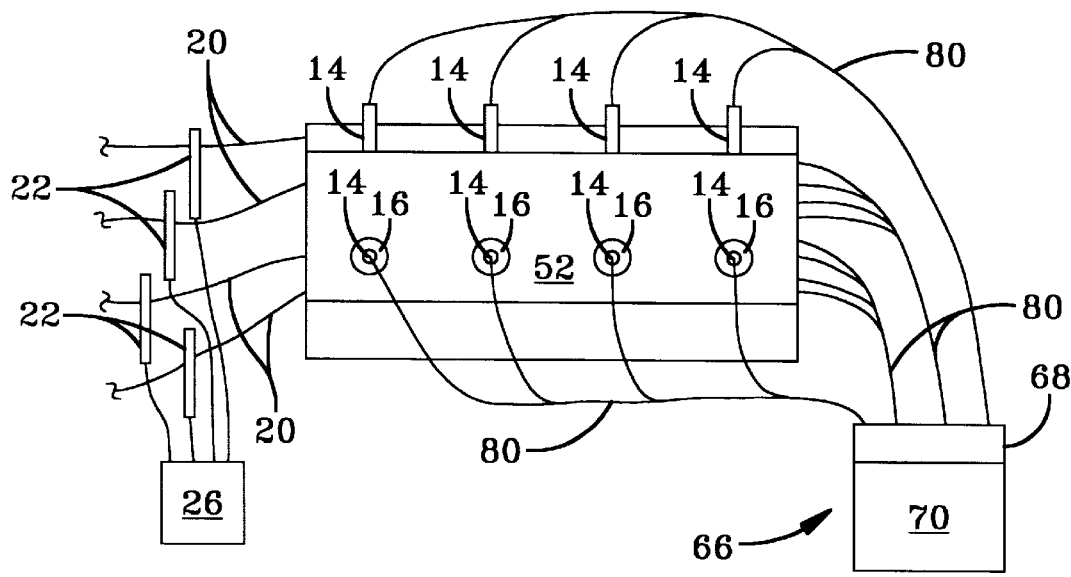
FIG. 7 is a schematic side view of the embodiment of FIG. 6.

FIG. 6 is a schematic cross-sectional end view of another embodiment of the invention. FIG. 7 is a schematic side view of the embodiment of FIG. 6. Like reference numerals in FIGS. 6 and 7 correspond to like features in FIGS. 1–4.

FIGS. 6 and 7 show a pultrusion die 52 having a more complex shape than the die 12 of FIG. 1. Because of the complex shape of the die 52, the cure rate at the same longitudinal position along the die, but at different areas of the transverse cross-section, may differ. Therefore, as shown in FIG. 6, a plurality of electrodes 14 are mounted in the pultrusion die 52 at substantially the same longitudinal position along the die but at different locations on the transverse cross-section of the die 52.

As discussed with regard to the embodiment of FIG. 1, the electrodes 14 are electrically isolated from the pultrusion die 52 by insulators 16. While FIG. 6 shows four electrodes 14 at a transverse cross-section of the die, it should be understood that more or less than four electrodes 14 may be used, depending on the particular die. The materials of construction of the die 52, insulators 16 and electrodes 14 are the same as the embodiment of FIG. 1.

The die mounted electrodes 14 are the voltage signal receivers or "sense leads." A plurality of second electrodes 20 are included in a resin-impregnated preform 58. The preform itself, without the resin, is preferably nonconductive. The second electrodes 20 are conductive filaments integrated into the preform 58.

Each second electrode 20 is located in the vicinity of an electrode 14 so that the resistance between the second electrode 20 and its respective first electrode 14 can be determined. Preferably, the second electrodes 20 are carbon tows. Carbon tows are advantageous because they are base materials for some polymer composites and will not negatively affect the mechanical properties of the finished material. The preform 58 is made of, for example, fiberglass tows.

The constant contact electrodes 22 in FIG. 7 are the same as shown in FIG. 2. The second electrodes 20 are in constant contact with the constant contact electrodes 22 prior to entering the die 52. The constant contact electrodes 22 are connected to a power supply 26. The power supply may be either direct current (DC) or alternating current (AC). The constant contact electrodes 22 provide voltage signals to the second electrodes 20.

The second electrodes 20 act as the signal carriers or "excitation leads." The type of current passed can be either direct current or alternating current. Direct current measures purely ionic mobility, which is better for examining gelation. Alternating current measures the dielectric properties. The polarities of the electrodes 14, 20 can be reversed if desired.

FIG. 7 is a schematic side view of the left hand side of the embodiment of the invention of FIG. 6. The constant contact electrodes 22 contact the second electrodes 20 before they are integrated into the preform and enter the die 52. It should be evident to one of skill in the art of pultrusion that the bundles of fibers that eventually become the preform and the addition of the resin to the preform are not shown in FIG. 7, for clarity.

As shown in FIG. 7, additional electrodes 14 and inserts 16 are mounted in the pultrusion die 52 at transverse cross-sectional positions as shown in FIG. 6, but longitudinally separated from each other. That is, the arrangement of the electrodes 14 in FIG. 6 is repeated at different longitudinal positions along the die 52. Thus, each longitudinal set of electrodes 14 provides a cure profile along the length of the die at a particular area within the die.

Each electrode 14 is connected by wires 80 to a voltmeter 68, which is part of a known data acquisition system 66. The data acquisition system 66 includes a computer 70. To generate the multiple cure profiles, the data acquisition system 66 includes a multiplexer for alternately sampling the various electrode combinations.

The number of die inserted electrodes 14 can be extrapolated to attain a continuous curve of the degree of cure along the length of the pultrusion die 52, as shown in FIG. 5. In the case of the embodiment of FIGS. 6 and 7, a degree of cure curve would be generated for each longitudinal set of electrodes 14, resulting in four curves total. Each curve represents the degree of cure for the area of the die 52 where the paired electrodes 20 and 14 are located.

While the invention has been described with reference to certain preferred embodiments, numerous changes, alterations and modifications to the described embodiments are possible without departing from the spirit and scope of invention as defined in the appended claims, and equivalents thereof.

What is claimed is:

1. An apparatus, comprising:
   a pultrusion die;
   a first electrode mounted in the pultrusion die;
   an insulator surrounding the first electrode in the pultrusion die;
   a resin-impregnated preform that includes a second electrode therein, the resin-impregnated preform being inserted into the pultrusion die;
   a constant contact electrode that contacts the second electrode; and
   a power supply connected to the constant contact electrode wherein electric current flows from the power supply to the constant contact electrode then to the second electrode then through the resin-impregnated preform to the first electrode.

2. The apparatus of claim 1 further comprising a data acquisition system connected to the first electrode.

3. The apparatus of claim 2 wherein the data acquisition system includes a voltmeter and a computer.

4. The apparatus of claim 1 wherein the insulator is made of a ceramic material.

5. The apparatus of claim 1 wherein the power supply is a direct current power supply.

6. The apparatus of claim 1 wherein the power supply is an alternating current power supply.

7. The apparatus of claim 1 wherein the pultrusion die and the first electrode are made of the same material.

8. The apparatus of claim 7 wherein the material is hardened steel.

9. The apparatus of claim 1 wherein one end of the first electrode is substantially flush with an internal surface of the pultrusion die.

10. The apparatus of claim 1 wherein the second electrode is a conductive filament integrated into the preform.

11. The apparatus of claim 1 wherein the constant contact electrode includes an opening formed therein through which the second electrode passes and makes contact with the constant contact electrode.

12. The apparatus of claim 10 wherein the second electrode is made of carbon.

13. An apparatus, comprising:
   a pultrusion die;
   a plurality of first electrodes mounted in the pultrusion die;
   a plurality of insulators surrounding the plurality of first electrodes, respectively, in the pultrusion die;
   a resin-impregnated preform that includes a second electrode therein, the resin-impregnated preform being inserted into the pultrusion die;
   a constant contact electrode that contacts the second electrode; and
   a power supply connected to the constant contact electrode wherein electric current flows from the power supply to the constant contact electrode then to the second electrode then through the resin-impregnated preform to the plurality of first electrodes.

14. The apparatus of claim 13 further comprising a data acquisition system connected to the plurality of first electrodes.

15. The apparatus of claim 14 wherein the data acquisition system includes a voltmeter and a computer.

16. The apparatus of claim 13 wherein the plurality of insulators are made of a ceramic material.

17. The apparatus of claim 13 wherein the power supply is a direct current power supply.

18. The apparatus of claim 13 wherein the power supply is an alternating current power supply.

19. The apparatus of claim 13 wherein the pultrusion die and the plurality of first electrodes are made of the same material.

20. The apparatus of claim 19 wherein the material is hardened steel.

21. The apparatus of claim 13 wherein the plurality of first electrodes are substantially flush with an internal surface of the pultrusion die.

22. The apparatus of claim 13 wherein the second electrode is a conductive filament integrated into the preform.

23. The apparatus of claim 13 wherein the constant contact electrode includes an opening formed therein through which the second electrode passes and makes contact with the constant contact electrode.

24. The apparatus of claim 22 wherein the second electrode is made of carbon.

25. An apparatus, comprising:

a pultrusion die;

a plurality of first electrodes mounted in the pultrusion die at substantially a same longitudinal position along the die but at different locations on a transverse cross-section;

a plurality of insulators surrounding the plurality of first electrodes, respectively, in the pultrusion die;

a resin-impregnated preform that includes a plurality of second electrodes therein such that a second electrode is disposed in a vicinity of a corresponding first electrode, the resin-mpregnated preform being inserted into the pultrusion die;

a plurality of constant contact electrodes that contact the plurality of second electrodes, respectively; and a power supply connected to the plurality of constant contact electrodes wherein electric current flows from the power supply to respective constant contact electrodes then to respective second electrodes then through the resin-impregnated preform to respective first electrodes.

26. The apparatus of claim 25 further comprising a data acquisition system connected to the plurality of first electrodes, the data acquisition system including a multiplexer.

27. The apparatus of claim 26 further comprising additional first electrodes and inserts mounted in the pultrusion die at transverse cross-sectional positions corresponding to each of the plurality of first electrodes but longitudinally separated from the plurality of first electrodes.

28. The apparatus of claim 27 wherein the additional first electrodes are connected to the data acquistion system.

* * * * *